Oct. 20, 1942.   C. H. DAY   2,299,384
LAWN MOWER ATTACHMENT
Filed Feb. 17, 1941
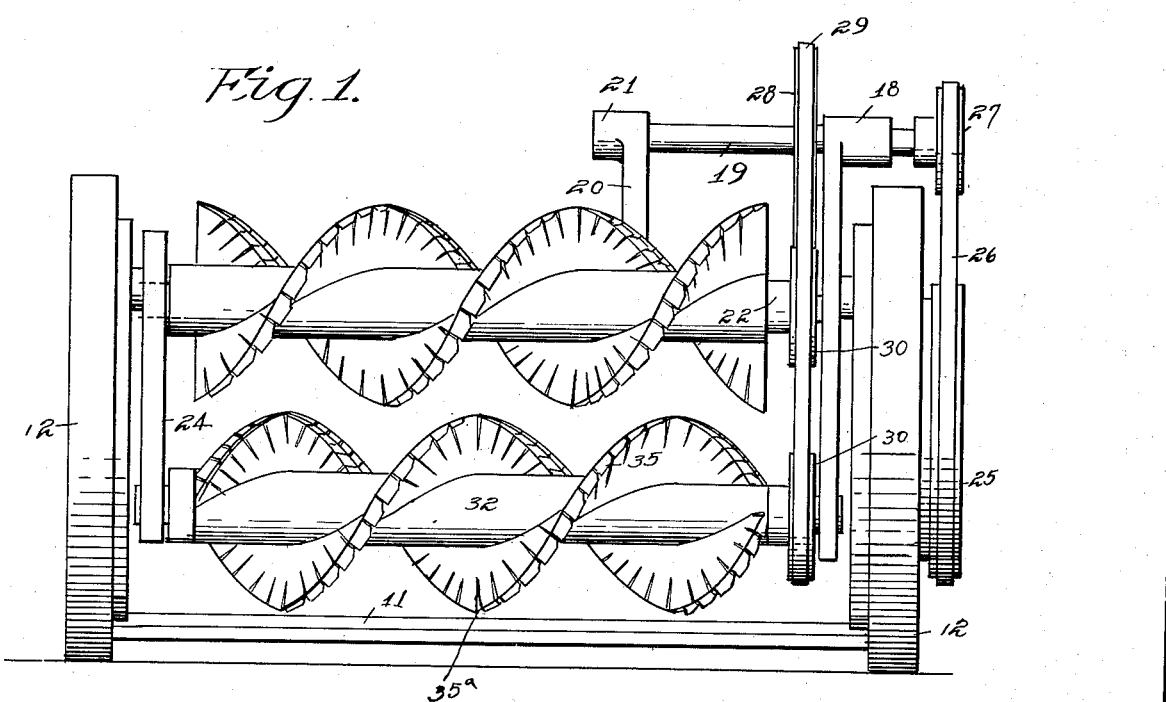
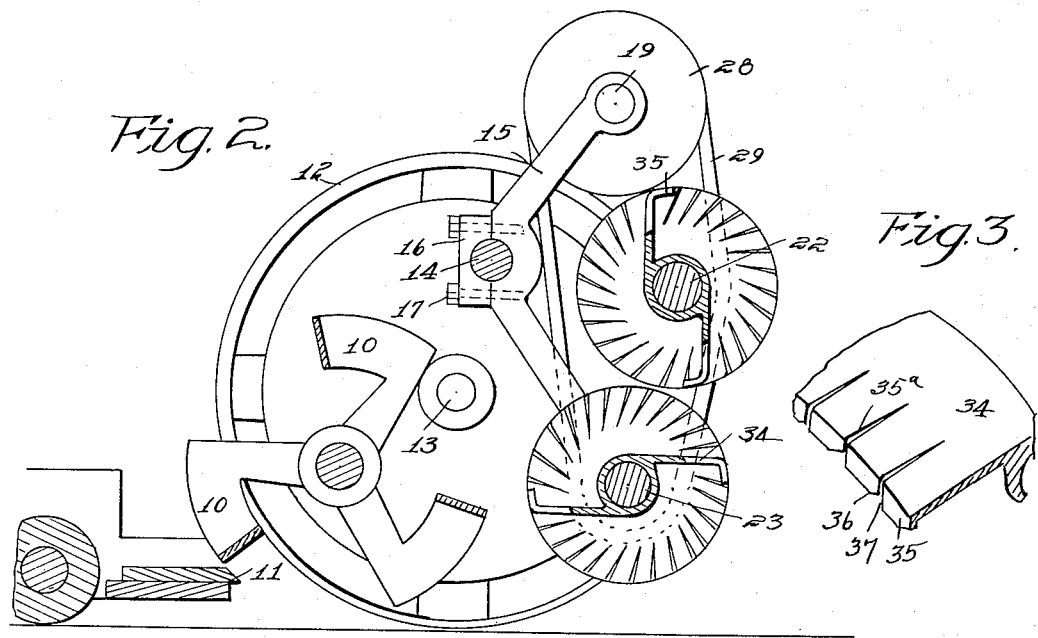
Inventor
Clarence H. Day Patented Oct. 20, 1942

2,299,384

UNITED STATES PATENT OFFICE 2,299,384

LAWN MOWER ATTACHMENT

Clarence H. Day, Kellogg, Iowa

Application February 17, 1941, Serial No. 379,216

2 Claims. (Cl. 56—238)

The object of my invention is to provide a device of simple, durable and inexpensive construction to be applied to a lawn mower for the purpose of engaging long weeds or grasses and moving them to and holding them in such positions relative to the lawn mower blade that they will be severed thereby.

In the accompanying drawing:

Figure 1 shows a front elevation of a lawn mower having my attachment applied thereto;

Figure 2 shows a central vertical sectional view of same; and

Figure 3 shows a detail perspective view of a portion of one of the weed-engaging members.

The portions of the lawn mower are of the ordinary construction and include a spiral-bladed rotating cutter 10, a stationary blade 11, supporting and driving wheels 12 on the axle 13, and a stationary brace rod 14.

My attachment comprises a frame member 15 detachably supported on the brace rod 14 of a lawn mower. It is shaped at one point to fit against one side of the brace rod, and a clamp 16 engages the other side of the rod and is held in position by bolts 17. At the top of the frame member is a bearing 18 for a drive shaft 19. Mounted in the frame member 15 are two shafts 22 and 23. The former is in an elevated position and widely separated from the cutter blade, and the countershaft is lower and nearer the cutter blade. The opposite ends of these shafts are supported in a bearing plate 24.

For rotating the shafts 22 and 23 I have provided the following mechanism:

Fixed to one of the lawn mower wheels is a large pulley 25 connected by a belt 26 with a small pulley 27 on the shaft 19, and fixed to the shaft 19 is a pulley 28 having a belt 29. On the shaft 22 is a pulley 30 engaged by the belt 29, and on the shaft 23 is a pulley 31 around which the belt is passed. By this means the shafts 22 and 23 are rotated upon the advance of the lawn mower in a clockwise direction, as shown in Fig. 2. By having these pulleys relatively proportioned substantially as shown, the weed-engaging and moving blades are rotated at relatively high speed which is advantageous in moving them to the cutter.

At each end of the shaft 22 is a collar 32 with radial arms 33, and supported by these arms are the weed and grass-engaging and moving blades. On each of said shafts are two weed-engaging and moving blades 34, each is of spiral form and at its outer edge it is inclined at 35 at such an angle that when a certain part thereof is approaching an upstanding tall weed, it will be inclined downwardly and forwardly. The blade is formed with a series of V-shaped slots 35a, and at the outer edge I have formed a series of inclined notches having an inclined surface 36 and a straight shoulder 37. As shown, there are two of such blades for the shaft 22 and a similar set of blades for the shaft 23.

In practice, and as the mower is being advanced, tall grasses or weeds will be engaged by the upper blade. This blade is moving downwardly, and because of its spiral shape it will tend to move the grass or weed laterally and downwardly, but because of the beveled surfaces 36 and straight shoulders 37, and the V-shaped slots 35a, it will not slide over the grass or weed but will bend them laterally and downwardly toward the cutter. Some grasses or weeds being very stiff and resilient, would tend to spring to upright position as soon as it was engaged by the spiral blade. For this purpose I have provided a second weed-engaging and moving device close to the cutter, and this engages the weeds or grasses that have been bent laterally and downwardly by the first device, and further moves them in the same direction and holds them in such positions until they are engaged by the cutter.

I have demonstrated that by moving tall weeds and grasses to, and holding them in proper positions relative to the lawn mower cutter, a much greater percentage of them will be cut off than can be done by similar blades with cutting edges or teeth; and I have found that with my improved blades which are not sharpened or toothed, the tall grasses and weeds are moved by them to position for having them cut by the mower blades.

If flat horizontally-arranged blades are used I find that they will bend the grasses or weeds straight forwardly to positions where they will not be engaged by the cutter blades, and I have found that when the front edges of the blades are spirally arranged and smooth, they will slide upon stiff grasses and weeds and push them straight forwardly and down. By having the blades spiral and rough or irregular in outline, as shown, they will engage the weeds and grasses but not become caught or entangled therein, and they will move them laterally and downwardly, and when this is done they will be cut by the mower.

I claim as my invention:

1. The combination with a lawn mower having coacting grass-cutting blades, of means for engaging tall weeds and grasses in advance of the grass-cutting blades and bending them laterally and downwardly and holding them in position to enter between said grass-cutting blades, said means comprising a horizontally arranged rotatable shaft carried by the mower above and in advance of the grass-cutting blades, a spirally arranged flange fixed to said shaft and having a series of inclined surfaces so shaped that when in position for engaging weeds, the inclined surface will tend to move the weeds thus engaged laterally, said flange also having a series of substantially flat surfaced shoulders adjacent said inclined surfaces, so shaped that when in weed-engaging positions they will hold the weeds being bent laterally from springing back over said inclined surfaces in the direction opposite from which they are being inclined by the said inclined surfaces, said tall weed and grass-holding device being so positioned relative to the grass-cutting blades that tall weeds and grass thus moved and held will be presented to the grass-cutting blades in proper positions to be severed thereby, and means operated by the mower for rotating said shaft.

2. The combination with a lawn mower having coacting grass-cutting blades, of means for engaging tall weeds and grasses in advance of the grass-cutting blades and bending them laterally and downwardly and holding them in position to enter between said grass-cutting blades, said means comprising a horizontally arranged rotatable shaft carried by the mower above and in advance of the grass-cutting blades, a spirally arranged flange fixed to said shaft and having a series of inclined surfaces so shaped that when in position for engaging weeds, the inclined surface will tend to move the weeds thus engaged laterally, said flange also having a series of substantially flat surfaced shoulders adjacent said inclined surfaces, so shaped that when in weed-engaging positions they will hold the weeds being bent laterally from springing back over said inclined surfaces in the direction opposite from which they are being inclined by the said inclined surfaces, said tall weed and grass-holding device being so positioned relative to the grass-cutting blades that tall weeds and grass thus moved and held will be presented to the grass-cutting blades in proper positions to be severed thereby, means operated by the mower for rotating said shaft, and a second similar tall weed and grass-bending and holding device located between and in the rear of the first, and means for rotating it.

CLARENCE H. DAY.